United States Patent [19]

Jensen

[11] Patent Number: 5,085,504
[45] Date of Patent: Feb. 4, 1992

[54] CONTROL SYSTEM FOR ADJUSTING THE REAR VIEW MIRROR OF A VEHICLE IN RESPONSE TO THE POSITION OF THE STEERING GEAR

[75] Inventor: Kaj B. Jensen, Skovbrynet 24, 2. tv, DK-4700 Naestved, Denmark

[73] Assignees: Kaj-Berg Jensen; Benita Berg Jensen; Bent Pedersen; Inge Pedersen, all of Naestved, Denmark

[21] Appl. No.: 460,880

[22] PCT Filed: Oct. 1, 1987

[86] PCT No.: PCT/DK87/00116
§ 371 Date: Jan. 30, 1990
§ 102(e) Date: Jan. 30, 1990

[87] PCT Pub. No.: WO89/00935
PCT Pub. Date: Feb. 9, 1989

[30] Foreign Application Priority Data
Aug. 3, 1987 [DK] Denmark ........... PCT/DK87/00097

[51] Int. Cl.⁵ .............................. G02B 7/18
[52] U.S. Cl. ..................... 359/843; 359/877
[58] Field of Search ............... 350/605, 606, 632, 637

[56] References Cited
U.S. PATENT DOCUMENTS

| | | | |
|---|---|---|---|
| 3,039,633 | 7/1963 | De Witt . | |
| 3,199,075 | 8/1965 | Simmons | 350/605 |
| 3,469,901 | 9/1969 | Cook et al. | 350/605 |
| 3,640,609 | 2/1972 | McKee et al. . | |
| 4,609,265 | 9/1986 | McKee et al. . | |
| 4,792,220 | 12/1988 | Janowicz | 350/637 |
| 4,796,206 | 5/1988 | Kusztos et al. | 350/605 |
| 4,820,032 | 4/1989 | Thompson, Jr. | 350/605 |
| 4,906,089 | 3/1990 | Biondi et al. | 350/605 |
| 4,907,870 | 3/1990 | Brucker | 350/637 |

FOREIGN PATENT DOCUMENTS

| | | |
|---|---|---|
| 3527079 | 1/1986 | Fed. Rep. of Germany . |
| 5376783 | 1/1980 | Japan . |
| 58-69374 | 6/1984 | Japan . |

Primary Examiner—Bruce Y. Arnold
Assistant Examiner—J. P. Ryan
Attorney, Agent, or Firm—Ladas & Parry

[57] ABSTRACT

The invention concerns a control system for adjusting the rear view mirror of a vehicle in response to the position of the steering gear. This object is achieved in that the apparatus the controlling parts, viz. a magnet and a reed contact are simple and inexpensive elements which can be so positioned without difficulty as to sense the movements of the steering gear, and their function is quite unaffected by the rough conditions by way of road dirt, water and oil to which they may be subjected when placed below the front end of a vehicle.

3 Claims, 1 Drawing Sheet

CONTROL SYSTEM FOR ADJUSTING THE REAR VIEW MIRROR OF A VEHICLE IN RESPONSE TO THE POSITION OF THE STEERING GEAR

BACKGROUND OF THE INVENTION

The invention concerns an apparatus for adjusting the angular position of a rear view mirror of a vehicle in response to the turning of the vehicle. Such as apparatus is known in principle from DE-A1-35 27 079 and in a special embodiment containing a rather complicated hydraulic system from U.S. Pat. No. 3,640,609.

SUMMARY OF THE INVENTION

The object of the invention is to provide an apparatus of the present type which combines simplicity with great reliability in operation.

This object is achieved in that the apparatus comprises a magnet and a reed contact, one of which is mounted on a movable part of the steering mechanism of the vehicle so as to cause activation of the reed contact when the vehicle is being turned through a preselected turning angle.

When activated, the reed contact is adapted to cause angular rotation of the rear view mirror. The apparatus controlling parts, viz. a magnet and a reed contact are simple and inexpensive elements which can be so positioned without difficulty as to sense the movements of the steering gear, and their function is quite unaffected by the rough conditions by way of road dirt, water and oil to which they may be subjected when placed below the front end of a vehicle. It will be appreciated that the axis of rotation of the mirror may be arbitrarily positioned and also that, according to the same principle, two axes of rotation may be involved, viz. a vertical one and a horizontal one. Further, the mirror may be journalled in a ball link in a generally known manner.

Generally, it is most expedient that the magnet is placed on the movable part of the steering gear, e.g. on a steering rod or a rack or a part connected with it and that the reed contact is firmly mounted; but the reverse may also be the case, although such mounting involves movable connecting wires.

A particularly simple embodiment, operates with only two different mirror positions. However, it has been found that this simple structure meets the practical needs satisfactorily.

BRIEF DESCRIPTION OF DRAWING

An embodiment of the apparatus of the invention is schematically shown in the drawing FIG. 1 and will be explained more fully below with reference to said drawing.

DETAILED DESCRIPTION OF THE PREFERRED EMBODIMENT

Figure 1:
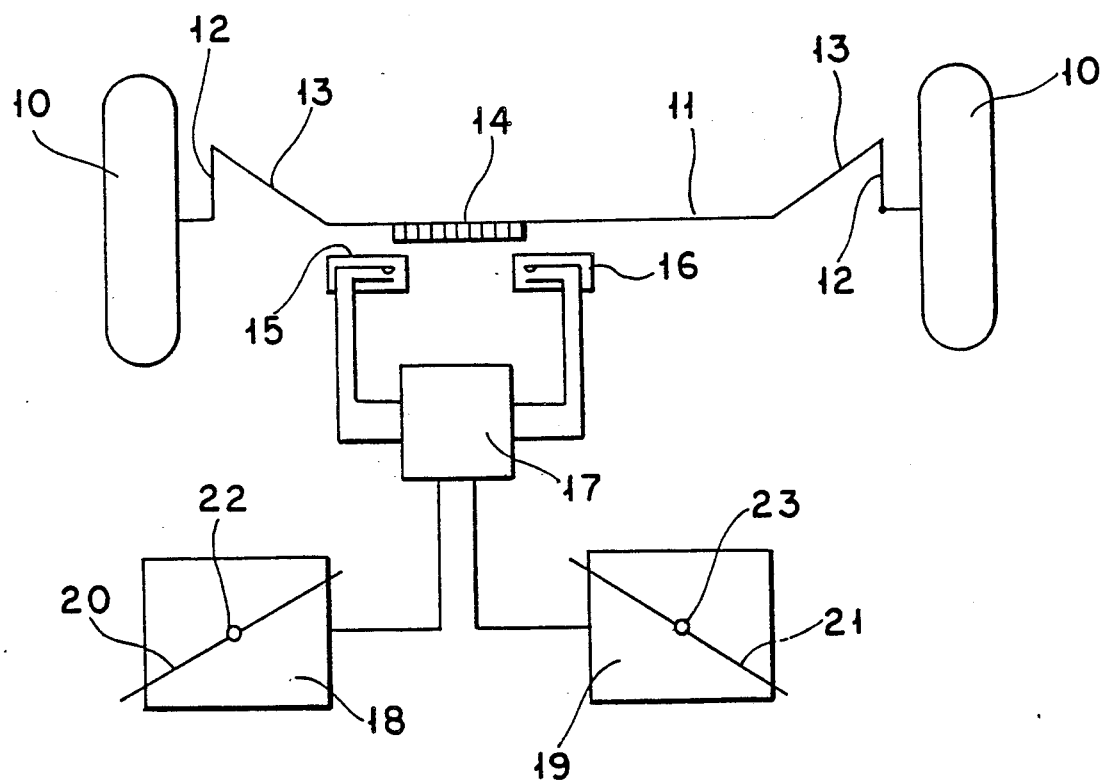

In the drawing, 10 are the front wheels of a vehicle, which can be turned in a generally known manner by displacement of a rack 11 whose ends are connected with pivotable arms 12 on the steering bolts through steering rods 13. The rack 11 mounts a relatively long bar magnet 14 which, in the neutral position of the steering gear, is present centrally between two firmly mounted reed contacts 15 and 16 without actuating any of these. The reed contacts are connected to their respective inputs to a control unit 17 having two outputs which are connected to their respective drive units 18 and 19 for a left rear view mirror 20 and a right rear view mirror 21, respectively, which are rotatable on vertical axes 22 and 23, respectively.

When the rack 11 is moved a predetermined distance, e.g. to the left, the left end of the reed magnet 14 actuates the reed contact 15. The control unit 17 is adapted to cause the drive unit 18 to rotate the mirror 20 through a predetermined angle clockwise upon closing of the contact 15 and to rotate the mirror back again when the contact 15 is opened upon return of the rack and the magnet to the neutral position. Similarly, steering movements in the opposite direction cause actuation of the reed contact 16 and rotation of the right rear view mirror 19 through a predetermined angle counterclockwise.

It is noted that the active pole area of the magnet is to have a sufficiently large extent in the direction of the rack for each reed contact to be kept actuated at all steering movements greater than the smallest actuation movement.

The details of the shown and described apparatus may be modified in many ways within the scope of the invention. For example, several reed contacts may be used for stepwise adjustment of the mirrors.

I claim:

1. A control system for adjusting the angular position of two rear view mirrors one each on opposite sides of a vehicle in respective response to the turning of the vehicle towards either of its sides by a vehicle steering mechanism, the system including a magnet and first and second reed contacts, said magnet being disposed between said first and second contacts, and said magnet and said contacts being positioned with respect to a moveable part of the steering mechanism so that said magnet moves with respect to said contacts upon steering movements, the first reed contact being adapted to cause the first of the rear view mirrors to rotate through a predetermined angle only after movement of the moveable part in a first direction past a first predetermined point during turning of the vehicle, said second reed contact being adapted to cause the second of the rear view mirrors to rotate through a predetermined angle only after movement of said movable part in a second direction opposite to that of said first direction past a second predetermined point, said first contact being further adapted to maintain said first mirror in its rotated position for all subsequent movements of the moveable part while still beyond said first predetermined point, said second contact being further adapted to maintain said second mirror in its rotated position for all subsequent movements of the moveable part while still beyond said second predetermined point, and each of said first and second contacts being further adapted to cause the corresponding first and second mirror, respectively, to rotate back to its original position in response to the return of the movable part, in a direction opposite to the said first and second directions, respectively, back past the respective ones of said first and second predetermined points.

2. A system according to claim 1, wherein said magnet is a bar magnet and said first and second reed contacts are each actuated by the magnetic field from a different one of the ends of said magnet.

3. A system according to claim 2, wherein said magnet is disposed relative to each of said reed contacts so that, in the straight ahead position of the vehicle, the magnetic fields from the magnet are insufficiently strong to actuate either of said reed contacts, and said magnet and said reed contacts being so arranged that the magnetic field from each end of the magnet is sufficiently strong to actuate and maintain actuated the corresponding reed contact for all subsequent movements of the moveable part past the corresponding predetermined point.

* * * * *